Fig. 1.

N. C. WALLENTHIN & E. C. SMITH.
PRESS.
APPLICATION FILED MAY 6, 1905.

947,360.

Patented Jan. 25, 1910.
5 SHEETS—SHEET 2.

WITNESSES
Thos. Howe
B. C. Rust

INVENTORS
N. C. Wallenthin
E. C. Smith
BY Foster
Freeman
Watson
ATTORNEYS

N. C. WALLENTHIN & E. C. SMITH.
PRESS.
APPLICATION FILED MAY 6, 1905.

947,360.

Patented Jan. 25, 1910.
5 SHEETS—SHEET 4.

N. C. WALLENTHIN & E. C. SMITH.
PRESS.
APPLICATION FILED MAY 6, 1905.

947,360.

Patented Jan. 25, 1910.
5 SHEETS—SHEET 5.

UNITED STATES PATENT OFFICE.

NILS C. WALLENTHIN, OF CENTRAL FALLS, AND EDWIN C. SMITH, OF PAWTUCKET, RHODE ISLAND, ASSIGNORS TO THE MOSSBERG WRENCH COMPANY, OF PORTLAND, MAINE, A CORPORATION OF MAINE.

PRESS.

947,360.   Specification of Letters Patent.   Patented Jan. 25, 1910.

Application filed May 6, 1905. Serial No. 259,198.

*To all whom it may concern:*

Be it known that we, NILS C. WALLENTHIN and EDWIN C. SMITH, citizens of the United States, residing at Central Falls and Pawtucket, respectively, in the county of Providence and State of Rhode Island, have invented new and useful Improvements in Presses, of which the following is a specification.

Our invention relates to punching-machines or power-presses, and particularly to mechanism for controlling their operation.

The object of our invention is to provide means for operating the press automatically, feeding the stock continuously to the machine and forming it into prescribed lengths.

Our improvement is of obvious advantage, providing as it does for greatly increased production.

Our invention embraces the essential features of a controlling mechanism, operating automatically to cause the action of the punch when the stock is fed to its proper position, but preventing such action upon failure of the stock to be properly fed, and means for ejecting the finished stock after each operation.

The invention is fully described in the following specification, illustrated by the accompanying drawings, in which.

Figure 1:
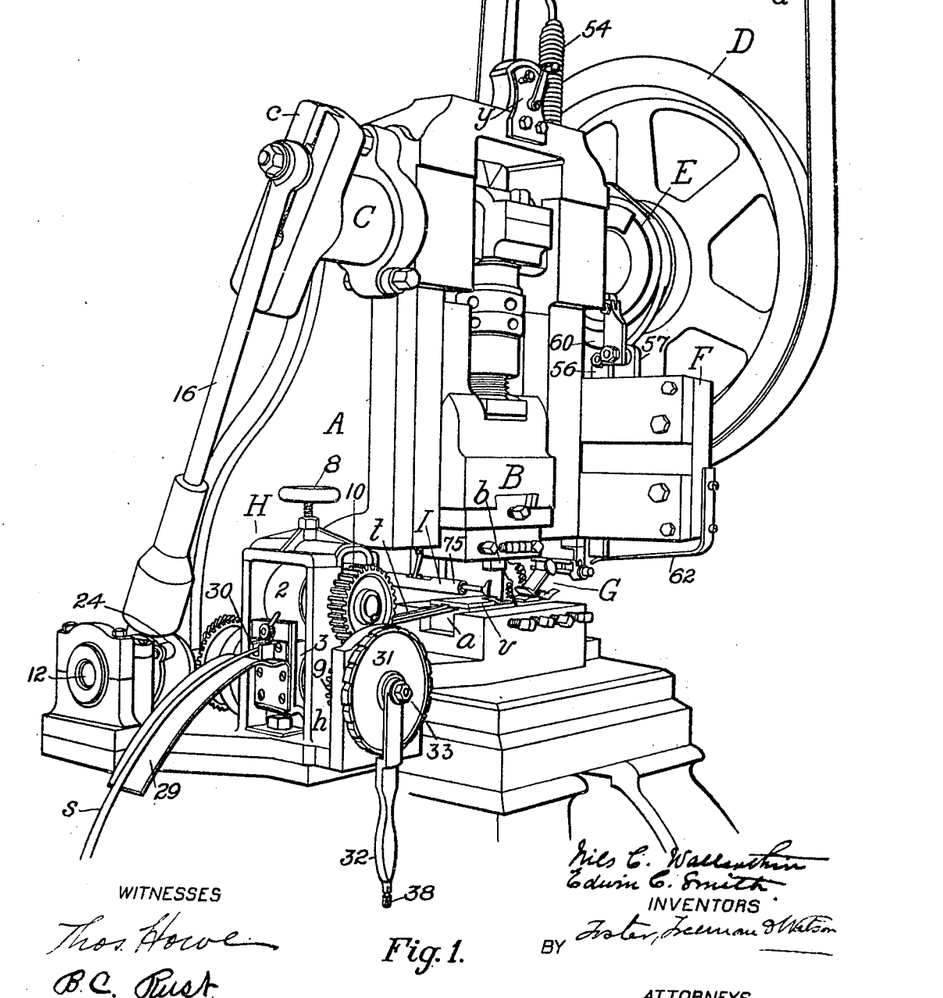
Figure 1 is a perspective view of the complete machine.

In Fig. 1 is shown a punching-machine or power-press of the usual design, fitted with the devices of our invention. The machine proper comprises the frame A, supporting the die $a$ on its base, and provided with vertical guideways for the sliding cross-head B, in which latter is carried the punch $b$ held in position by any suitable arrangement. The cross-head B is reciprocated from the shaft C by any suitable means as, for instance, a cam or crankmotion not here shown in detail. The shaft C is driven by a continuously rotated balance wheel D through a clutch mechanism shown at E, the latter to be more specifically described hereinafter. The clutch is operated by the device at F, the latter being controlled by a device at G, operated either electrically or mechanically, by the stock being fed into it. In Fig. 1 we have shown the electrical contact device in place at G, this being the preferable arrangement.

The machine is especially adapted for strip stock, either flat or round wire for instance, and we prefer to employ a feeding mechanism, shown at H, for securing automatically a continuous supply of material. However, it will be understood that the supply might be effected manually, if desired.

The ejecting device whereby the finished pieces are automatically thrown out from the die, to make room for the raw stock, is indicated at I.

Figures 2, 3, 4, 5:
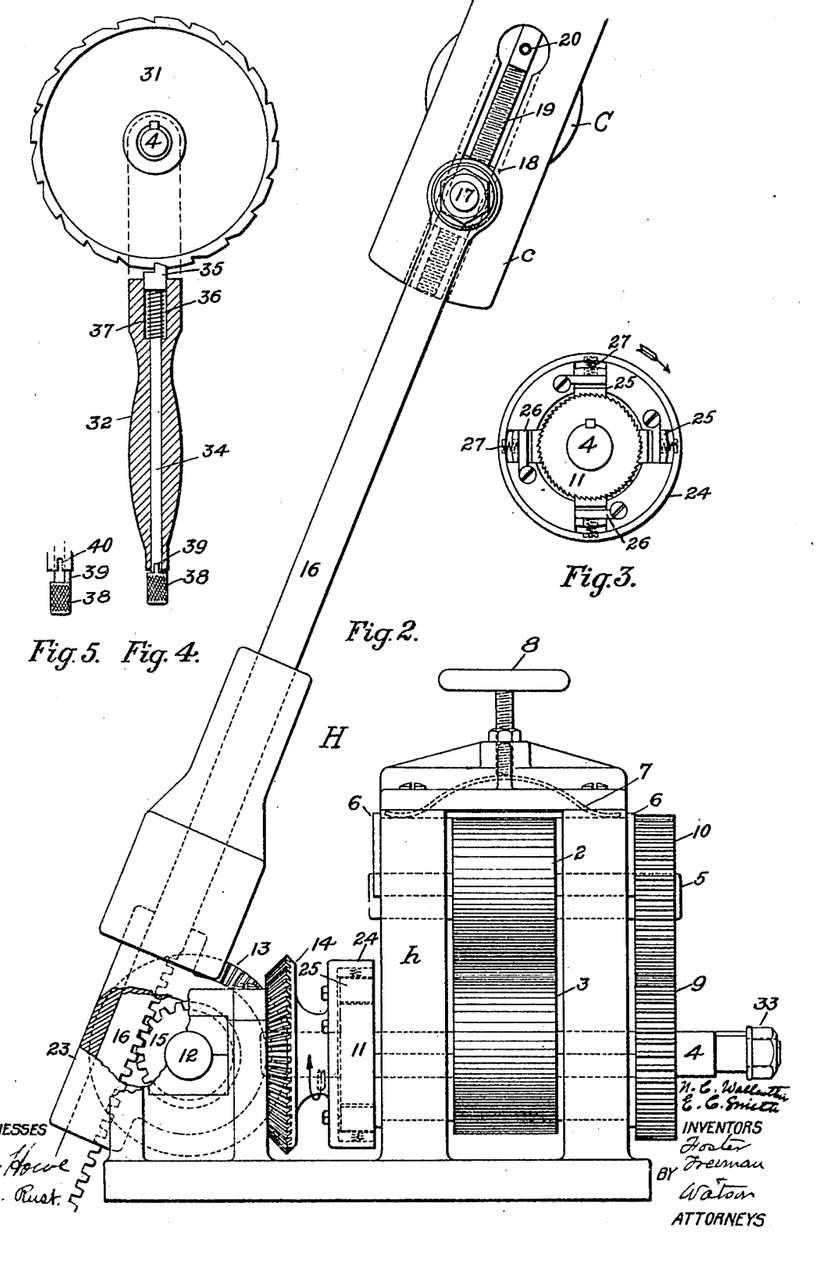
Fig. 2, an elevation of the feeding mechanism.
Fig. 3, a detail of the feeding mechanism clutch.
Fig. 4, a detail of the means for operating the feeding mechanism manually.
Fig. 5, another detail of the same.

Referring now to Fig. 2, the feeding mechanism we have preferred to use consists essentially of two rolls 2 and 3 held in resilient contact with the stock and adapted to be intermittently rotated toward each other, through suitable means connected with the shaft C of the machine. The lower roll 3 is fixedly mounted on a shaft 4, supported in stationary bearings in the frame $h$, but the bearings for the shaft 5, on which the roll 2 is fast, are slidable vertically in the frame $h$. These upper bearings are two blocks 6—6 having seats for the shaft on their under sides, and pressed downward by a bow-shaped spring 7 the ends of which rest on the blocks. The tension of the spring 7 may be adjusted through the handscrew 8, the end of which presses on the bow of the spring. When the stock is entered between the rolls, a sufficient pressure is exerted by the top roll to secure a contact which will feed the stock along, when the rolls are rotated toward each other. To impart an equal rotation of the two rolls, we provide the equal gears 9 and 10 mounted on the outer ends of the shafts 4 and 5. The shaft 4 is driven in one direction only, through a ratchet 11 operated from the shaft 12 through the bevel gears 13 and 14. The bevel gear 13 and a spur gear 15 are both fast on the shaft 12. Engaging the gear 15 is a rack, formed in the rod 16, the upper end of the rod being connected to the crank $c$ on the shaft C of the machine. The crank $c$ imparts a reciprocating motion to the rod 16 and through its rack connection with the gear 15, a back and forth movement is given to the shaft 12. The part rotation of the shaft 12 is communicated to the rolls 2 and 3 to drive them in one direction only, to feed the stock as hereafter described, and in order to regulate the amount of rotation of said rolls, the connection of the rod 16 with the crank $c$ is preferably adjustable, to vary the throw of the crank. This is effected by mounting the crank pin 17 on a block 18 arranged to slide in a feather groove extending longitudinally of the crank. To adjust the block toward or away from the center of the crank, a screw 19 is provided, having one end anchored in a bearing adjacent the center of the crank. By entering a suitable wrench in the hole 20 of the screw, the latter may be turned to slide the block 18 in its groove. The crank pin is locked in its adjusted position by means well known for the purpose, and therefore not here described. The rod 16 slides in a bearing 23 which is swiveled on the shaft 12 allowing the rod to oscillate during its reciprocation. The back and forth rotation of the gear 13 is imparted to the gear 14, the latter being loose on the shaft 4 and, during its rotation in the direction indicated by the arrows, Figs. 2 and 3, the gear 14 engages the shaft 4 through its ratchet connection now described. The hub of the gear 14 extends in a ring-like casing 24 surrounding the ratchet wheel 11, see Fig. 3. Adapted to slide in pockets in the casing are a number of pawls, 25, 25, etc., having teeth on their inner edges adapted to engage the teeth of the ratchet wheel. The pawls are held in their pockets by the flat pieces 26, 26, fitted to slots in their faces and screwed to the casing, and spiral springs 27 27 etc. held in suitable pockets in the pawls, and in the casing, press the pawls radially inward. When the gear 14 rotates in the direction indicated by the arrow, the pawls engage the ratchet wheel, and the rotation of the shaft 4 imparted through the ratchet, rotates the roll 3 and, through the gears 9 and 10, turns the roll 2 with the same amount of rotation.

Referring now to Fig. 1, the stock $s$, which we have preferred to show as flat wire, is brought up from a reel or other supply, over the curved plate 29, and started through the guide 30 leading between the rolls 2 and 3. When introducing a new strip of stock or for adjusting the stock in position, it is sometimes necessary to operate the feed manually, and for this purpose we provide the ratchet wheel 31 and hand lever 32. The wheel 31 is fitted and keyed to a shouldered portion of the shaft 4, see Figs. 2 and 4. The handle lever 32 is mounted free to swing on the end of said shaft, held in place by a washer screwed against a second shoulder on the shaft by the nut 33. Extending through a bore in the lever 32 is a plunger 34, see Fig. 4, having at its inner end the head 35 formed as a beveled catch. The rim of the wheel 31 is notched and the head or catch 35 engages the notches when pressed inward by the spring 36, the latter arranged in a pocket 37 in the lever 32. At the opposite end of the plunger is a knurled head 38 having a key 39 which fits the slot 40 in the outer end of the lever 32. When the key 39 is entered in its slot, the plunger is free to be pressed by its spring 36 to engage the ratchet wheel, but by drawing the plunger out until the key is free from its slot and then turning it until the key rests on the end of the lever, as shown in Fig. 5, the catch is held away from the ratchet, so that the wheel 31 normally rotates free from the lever 32. In other words, when the feed is operating automatically, the lever 32 hangs free and inoperative. From the feed rolls the stock is delivered across a bridge or support $t$, under the stripper plate $v$ and over the face of the die $a$.

We have preferred to show the punch $b$ designed simply for cutting off lengths of the stock, but it will be obvious that the punch and die might be adapted to form the stock to any desired shape or to perforate it, as required, all at the same operation of cutting off. After passing across the face of the die, the stock, if fed to its proper position, engages the device for controlling the action of the machine clutch E. Means for accomplishing this control electrically in the device at G will now be described. This is a contact device arranged to complete an electric circuit upon the entrance of the stock.

Figure 9:
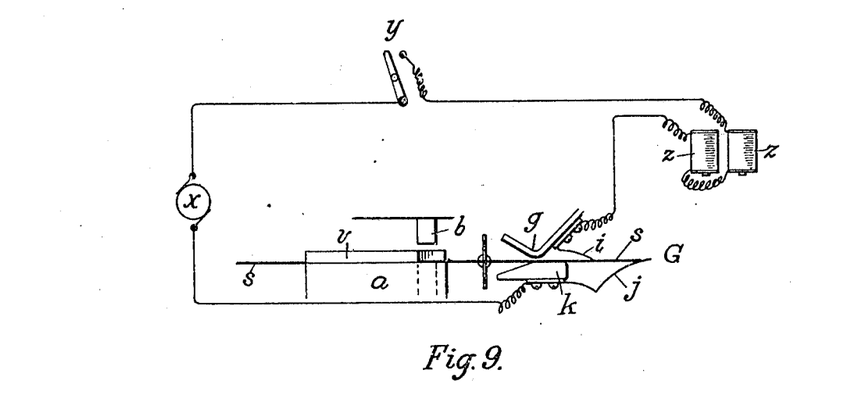
Fig. 9, a view of the contact device of the controlling mechanism with the electrical connections shown diagrammatically.

Referring to Fig. 9, $x$ represents the current generator, $y$ the switch which, for convenience, is located at the top of the machine frame, see Fig. 1, and $z$ $z$, the magnet coils which actuate an armature, the tripping element of the clutch-control device to be afterward described. One pole of the generator $x$ is connected through the switch $y$ to the magnet coils $z$ $z$, and the circuit is continued thence to the terminal $i$, which is here shown as a piece of spring metal extending downward from the guide-piece $q$ of the contact device G. The opposite pole of the generator is connected to the terminal $j$, which is a flat spring extending upward from the guide $k$.

The electric circuit is normally open, with the switch $y$ closed but as the stock $s$ is fed from the die, it enters between the guides $q$ and $k$ and contacts with the spring pieces $i$ and $j$, closing the circuit and energizing the magnet coils $z\ z$, see Fig. 9.

It now being understood that the positioning of the stock in its proper relation to the die closes the circuit, it will next be described how the magnet $z\ z$ controls the clutch mechanism of the machine.

Figures 6, 7, 8:
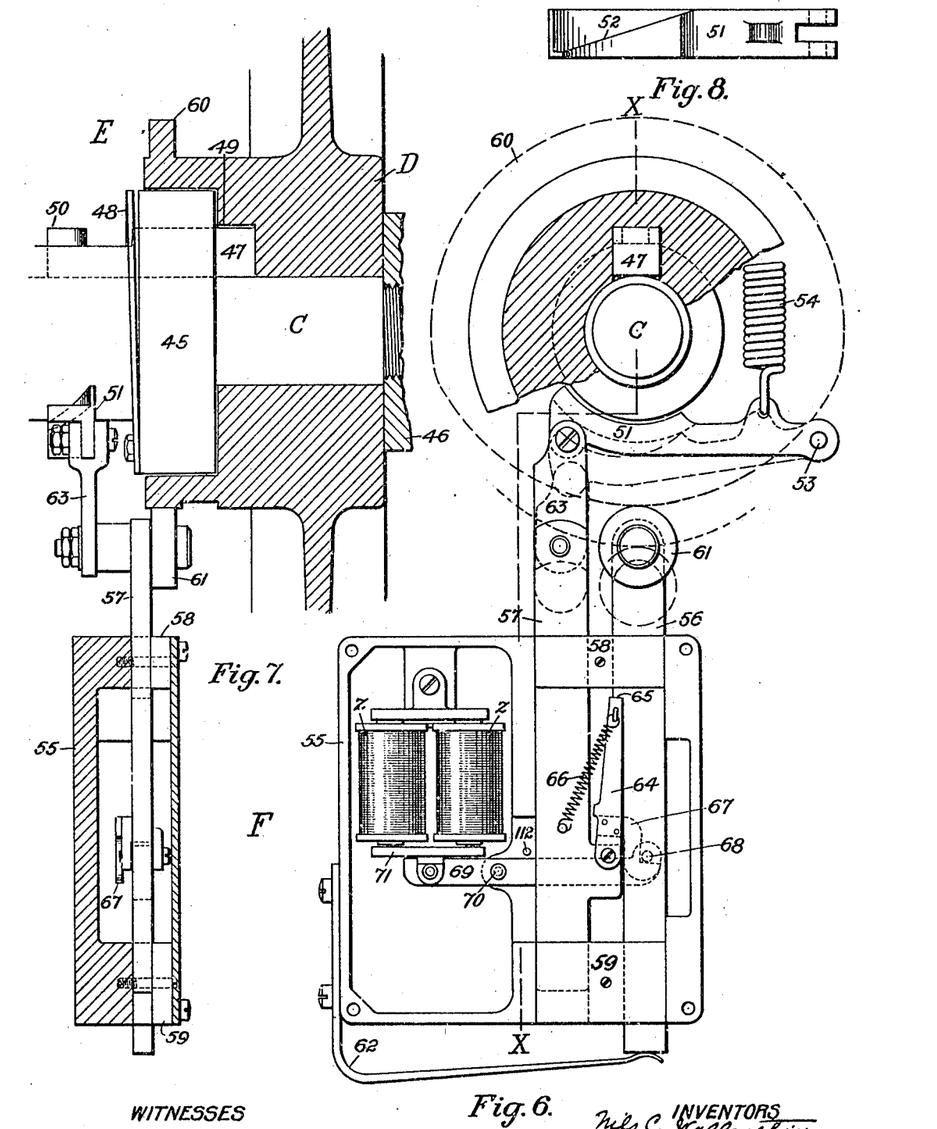
Fig. 6, a part sectional view of the punching machine clutch mechanism of the punching machine and the controlling mechanism therefor.
Fig. 7, another view of the same, being a section on the line X—X, Fig. 6.
Fig. 8, a detail of the clutch key lever.

The balance-wheel D, Fig. 1, is rotated continuously by the belt $d$ or other suitable means and is mounted on the shaft C between a flange 45 and the collar or nut 46 screwed on the end of the shaft, as shown in Fig. 7. The wheel D is free to rotate without the shaft, the clutch means being a key 47 slidable in a keyway extending through the flange 45. A flat, ring-like spring 48 fastened at one end to the flange 45 extends partly around the shaft C, engaging a shoulder on the key 47 with its free end, to press the key toward the balance-wheel. A suitable pocket 49 is provided in the hub of the balance-wheel to receive the key 47. At the outer end of the key is a lug 50 having a rounded face adapted to be acted upon by a cam face 52 on the lever 51 to throw the key out of engagement with the balance-wheel. The lever 51 is shown more plainly in Fig. 6 and the cam-face 52 is illustrated in the plan view Fig. 8. The lever 51 is pivoted at 53 with its free end held upward by a spring 54, so that the cam-face 52 lies directly in the path of rotation of the lug 50. With the lever in the position shown by full lines, Figs. 6 and 7, upon the rotation of the shaft, the lug 50 engages the cam-face 52 and the key 47 is withdrawn from its pocket.

Figure 11:
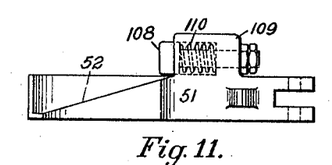
Fig. 11 shows a modification of the clutch key lever.

In Fig. 11 is shown a modification of the lever 51 in which a buffer-stop is provided for the shaft C. In some cases, this is not necessary, the friction of the cam surface acting on the key 47 against the pressure of the spring 48 being sufficient to brake and stop the shaft C after the key 47 is withdrawn; but where the press is running at a very high speed, it is considered safer to provide means for positively stopping the shaft. After the lug 50 has passed across the cam-face of the lever 51 and the key 47 has been entirely withdrawn from its pocket in the balance wheel, if the rotation of the shaft C is continued through momentum, the lug 50 is brought into contact with the plunger 108. The latter is held in a bore in the lug 109 of the lever 51, and the spring 110, arranged in a pocket back of the head of the plunger, serves to break the shock of the impulse in stopping the shaft. The shaft C is thus brought to rest without jar, and the balance-wheel then rotates free, the machine being inoperative until the lever 51 is drawn down again to release the key 47 and allow it to reënter its pocket when the latter is brought around to its proper position.

The reciprocation of the head B of the press, which carries the punch $b$, is so timed, relative to the operation of the clutch-key 47 and the cam-face 52, that the key is withdrawn on the upward stroke of the punch, so that the punch remains in its uppermost position upon the stopping of the shaft C. It will be seen that the punch $b$ can only be operated at each rotation of the balance wheel, when the lever 51 is withdrawn from its position of engagement with the clutch key at each rotation. The withdrawal of the lever 51 is accomplished by intermittent action on the part of devices now to be described, whose operation depends on the closing of the electric circuit by the feeding of the stock, as before described.

Supported on the frame of the press below the clutch is a casing or frame 55 in which are inclosed the magnet coils $z$—$z$, and also provided bearings for two reciprocating plungers 56 and 57. These plungers are held in suitable guideways in the frame 55 by the gibs 58 and 59 fitted to the guideways and screwed to the frame. The plunger 56 is reciprocated upon each rotation of the balance wheel, this being accomplished by a cam 60 formed on the hub of the wheel, see dash lines Fig. 6. The cam 60 engages a roll 61 fastened rotatively at the top of the plunger 56 and a spring 62 fastened at one end to the casing 55 engages with its free end the bottom of the plunger to hold the roll against the cam. The cam 60 is shown so formed that the plunger 56 is held in its lowermost position during a little more than half the rotation of the balance wheel, but this is not essential in all instances, as it is sometimes preferable that it throw the plunger 56 two or more times during one rotation of the balance wheel D.

The plunger 57 is connected at its upper end to the free end of the lever 51 by a link 63. Pivoted on a lug adjacent the lower end of the plunger 57 is a pawl 64 adapted to engage a shoulder 65 in the plunger 56. The pawl 64 is held away from engagement with the plunger 56 by the light coiled spring 66. Extending from the pawl is an arm 67 adapted to engage a pin 68 held at the extremity of a lever 69. The lever 69 is pivoted at 70 and at its opposite end carries the armature 71 adjacent the magnet coils $z$—$z$. When the pawl 64 is out of engagement with the plunger 56, the arm 67 holds the lever 69 with its longer end tilted upward so that the armature is in a position closely adjacent, but out of contact with the magnet. With the pawl 64 out of engagement with the plunger 56, the latter is free to reciprocate alone at each revolution of the balance-wheel, the plunger 57 remaining stationary in its uppermost position. The lever 51 is then in engagement with the key 47 to hold the latter out of engagement with the balance-wheel, allowing the shaft C to remain still. When, however, the stock is fed to the proper position to be acted upon by the die, the electric-circuit is closed by the contact device at G and the magnet is energized. The magnet attracts the armature 71, moving the lever 69 and, through the arm 67, rocking the pawl 64 to carry the latter into engagement with the plunger 56, when the latter reaches its uppermost position. The shoulder 65 then engages the pawl 64 and through said engagement the plunger 57 is now carried downward by the plunger 56. The lever 51 is thereby drawn away from its active position, releasing the key 47 which enters its pocket in the hub of the balance wheel when the latter is in proper position. The shaft C, now connected with the balance wheel, is rotated to operate the cross-head which carries the punch down through the die, cutting off a length of stock. The length of stock cut off is then ejected from the die by the device hereafter described and, as the punch is being withdrawn, the stock is fed into position for the next operation. The ejection of the finished piece opens the electrical circuit of the control device again, and the magnet coils are deënergized, releasing the armature 71 and allowing it to fall away a short distance, the rocking of the lever 69 being limited by the pin 112. Before the plunger 56 returns to its uppermost position, the stock is in position to complete the circuit again, providing, of course, the supply has not been exhausted or the stock held back, by clogging under the stripper plate or through other accident. The closing of the circuit energizes the magnet coils again and raises the armature 71 to rock the lever 69 so that the pawl 64 is not withdrawn from engagement with the plunger 56, but the two plungers remain connected and are both reciprocated by the cam 60. In this way it will be seen that if the stock is advanced into proper position after each operation of the die, the control device will act at proper intervals to keep the lever 69 from disengaging the pawl from the plunger 56, and therefore the lever 51 will be drawn down at each rotation of the shaft C. The rotation of the cam 60 is so timed, relative to the key 47 that the lever 51 is moved away before the lug 50 reaches the cam surface, so that a continuous operation of the punch is maintained, providing the stock feeds properly. Sometimes, however, there are irregular places in the stock, as, for instance, where two pieces are joined together, and it is not desirable to use these imperfect portions. To prevent their being fed under the stripper plate, the latter is so formed as to present only just large enough an opening to admit the proper thickness of stock. When an enlarged portion passes through the feed rolls, its movement is arrested at the stripper plate, and upon failure of the stock to reach the contact device, the machine is stopped, it being understood that the stopping of the machine is effected through failure of the electric circuit to be closed at the contact device G. When the magnets are not energized, the lever 69 remains tilted, with the pin 68 elevated out of position to engage the arm 67. Therefore, when the plunger 56 reaches its uppermost position, there is nothing to retain the pawl 64 in engagement with the shoulder 65, and the spring 66 carries the pawl away from the plunger 56. The plunger 57 is not carried down with the plunger 56 at the next reciprocation, but remains with the lever 51 in position to engage and withdraw the clutch key 47 to arrest the rotation of the shaft C and stop the machine. It is pointed out that if the stock meets with resistance at the opening in the stripper plate, and the feed rolls continue to rotate slightly before the machine is stopped, no damage will result, because the stock simply bows up from the bridge $t$ to take up this extra feed.

By employing a properly shaped punch and die, the stock on the die may be formed in any desired manner at the operation of cutting off the preceding length, and then at the next operation this formed length is cut off and the succeeding length formed, and so on through the continuous operation of the machine.

It will be evident that as each length of stock is cut off it must be removed from the die to make room for the length of stock to be next operated upon. This might be accomplished manually, but to provide for increased speed and greater production of the machine, we prefer to employ for this purpose the automatic ejecting device now described.

Figure 10:
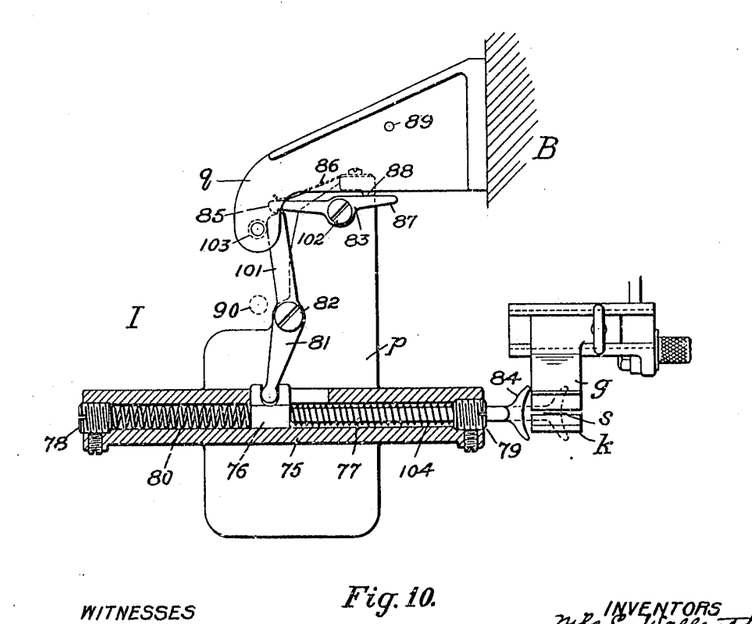
Fig. 10, a view of the ejecting device.

Supported by a bracket $p$ on the frame of the machine, back of the die, is a cylindrical barrel 75, to the bore of which is fitted the head 76 of the plunger 77, see Fig. 10. The ends of the barrel are closed by the screws 78 and 79, the plunger projecting through a bore in the screw 79. Between the head 76 of the plunger and the screw 78 is compressed a strong coiled spring 80 and on the opposite side of the head surrounding the plunger and bearing on the screw 79 is a much lighter spring 104. On the projecting end of the plunger 77 is secured a crescent shaped striker 84, normally positioned just back of path of travel of the stock, and adapted to cross said path between the die and the contact device G, see Fig. 1. The plunger 77 is controlled through the lever 81 pivoted at 82, the lower arm of which engages a slot in an extension of the head 76. This extension projects through a slot in the barrel 75, the length of the slot limiting the throw of the plunger. The lever 81 is held in the position shown, to retain the plunger in its rearward position by a trip lever 83 having an arm 85 engaging the arm 101. The lever 83 is pivoted at 102 and the arm 85 is pressed downward by the spring 86, secured to the top of the bracket $p$. A second arm 87 contacts with the lug 88 on the bracket $p$ to limit the movement of the lever 83. Fastened to the cross-head B of the press is a bracket $q$ having a pin 89 adapted to engage the arm 87 of the lever 83 when the cross-head descends. On the outer end of the bracket $q$ is a stud or roll 103 adapted to engage the arm 101 of the lever 81 when the cross-head returns.

The action of the ejecting device I is as follows: In Fig. 10, the parts as shown by full lines are represented in normal position. As the cross-head B descends with the punch, the pin 89 approaches the arm 87 of the lever 83, engaging the arm at the finish of the stroke, after the stock has been operated upon and the piece cut off. The arm 87 is depressed, raising the arm 85 and releasing the lever 81. At the release of the lever 81, the spring 80 forces the plunger forward into the position indicated by dotted lines, the striker 84 engaging the edge of the piece of severed stock $s$ and ejecting it from the die into a properly placed receptacle, not here shown. It will be seen from Figs. 1 and 9 that the stripper plate $v$ is cut away sufficiently to allow the finished piece to be thrown out from the die.

The plunger 77 is restored to its normal position by the stud 103 acting on the arm 101. It will be seen that the lower position of the stud as shown by dotted lines at 90, allows the free movement of the arm 101 when the lever 81 is released, but as the cross-head B moves upward, the stud 103 engages the arm 101 and carries it back to be latched under the arm 85 of the lever 83. But the action of the feed of the machine is so rapid that this means for restoring the plunger 77 to its original position is not quick enough to remove the striker 84 from the path of the stock before the latter has been moved forward to its new position. To accomplish a quick return of the plunger from its forward position, the recoil spring 104 is depended upon. When the plunger 77 is projected forward by the spring 80, it compresses the lighter spring 104, but as soon as the momentum of the plunger, due to the projective energy of the spring 80, is spent, the spring 104 reacts upon the plunger quickly returning it to a position such that the striker 84 is out of the path of the stock. The lever 81 then acts as before described to withdraw the plunger to its rearmost position.

Figure 12:
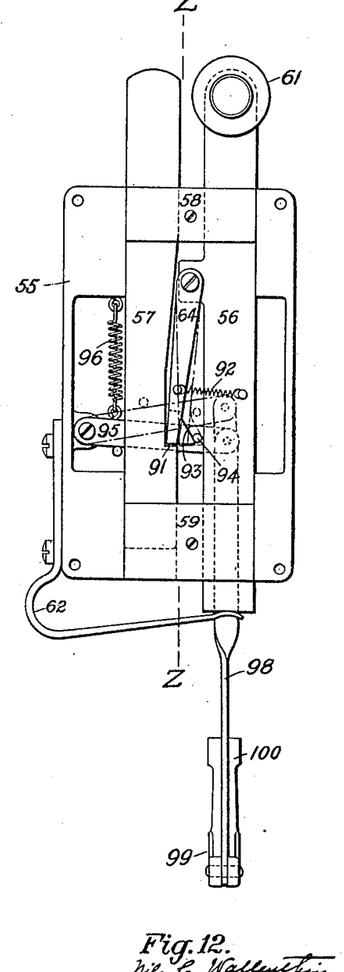
Fig. 12 shows a modification wherein the clutch controlling device is arranged to be operated mechanically.
Figure 13:
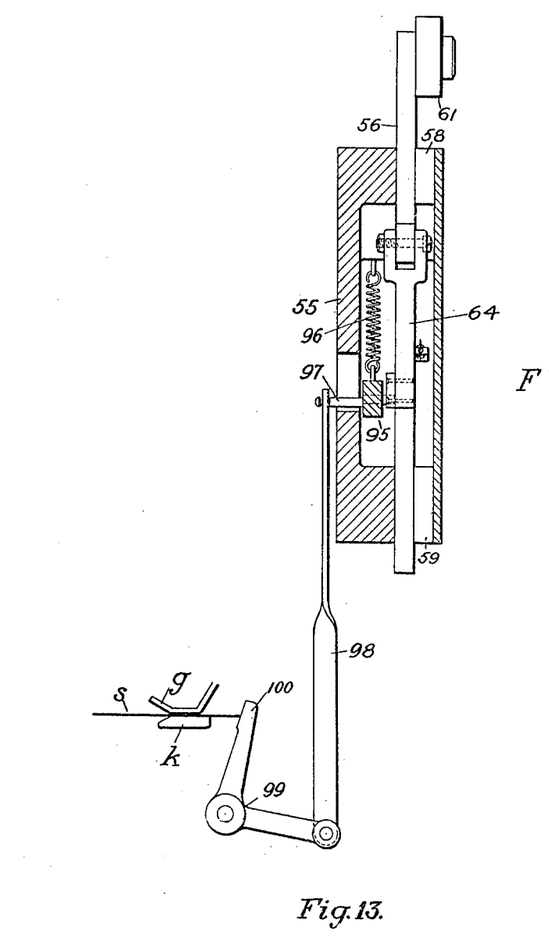
Fig. 13, a part sectional view of the same, taken on line Z—Z, Fig. 12.

While we prefer to operate the machine through the electrical control device described, it will be seen from the following that a mechanical control might be used for the purpose and we have shown such a means in Figs. 12 and 13. The casing 55 is made smaller in this instance, it not being required to contain the magnet coils, but otherwise it is essentially the same as before described, and provides bearings for the two plungers 56 and 57. While in the previously described device the pawl 64 is shown pivoted to the plunger 57, its effect would be the same if pivoted to the plunger 56, and in this device we so illustrate it. In this modification, the pawl 64 engages a shoulder 91 in the plunger 57, being normally held from such engagement by the spring 92, and to effect the engagement, a cam face 93 is provided at the lower end of the pawl. The cam face 93 is operated upon by a pin 94 fastened in the lever 95, the latter pivoted at one end to the casing 55, and normally held upward by a spring 96. Connected to the free end of the lever 95 by a pin 97 extending through a slot in the back of the casing 55 is a link 98 which in turn is connected to the bell-crank lever 99. The lever 99 has one arm 100 extending upward across the path of the stock, as it feeds from the die into the guides $g$ and $k$. The operation of this form of device is as follows:— The plunger 56 is being constantly reciprocated through the cam 60 previously described, and with the feed of the machine inoperative, before the supply is started, the pawl 64 hangs inoperative in the position indicated by dot-and-dash lines, Fig. 12, the lever 95 being raised to the position also indicated by dot-and-dash lines. As the stock is fed under the stripper plate and thence through the guides $g$ and $k$, its end contacts with the arm 100 of the lever 99 and rocks the latter into the position indicated in Fig. 13. The movement of the lever 99, through the link 98, carries the lever 95 downward into the position indicated by full lines in Fig. 12, and the pin 94 acting on the cam face 93 forces the pawl 64 into engagement with the plunger 57. The action of the lever 95 takes place after the plunger 56 has reached its uppermost position, there being sufficient dwell at this point to allow the pawl to be carried into engagement with the shoulder 91. As the plunger 56 moves downward at the next stroke, it carries the plunger 57 downward, and the lever 51 is drawn down thereby to release the key 47 and allow it to engage the balance wheel D whereby the shaft C is rotated to operate the machine, as heretofore described. It will be seen that with each movement of the stock forward, the lever 95 is carired downward, and if the stock is properly fed after each stroke of the punch, the pawl 64 will be kept in engagement with the plunger 57 so that the latter is reciprocated continuously from the plunger 56, and the shaft of the press is kept in continuous rotation. When, however, the feed fails, the lever 95 remains in its uppermost position and the pawl 64 is withdrawn from engagement with the plunger 57 by the spring 92 so that the plunger remains stationary, with the lever 51, Figs. 6 and 7, in position to engage and retain the clutch key 47 out of engagement with the balance wheel.

Upon the automatic stopping of the press, the operator finds the trouble, remedies it, and starts the stock under the stripper plate again, feeding it manually by means of the ratchet lever 32. Immediately the stock reaches the control device, the machine is started automatically, and continues to operate until some further difficulty arises. When provided with the electrical control, the machine may be stopped at will, for adjustment or other purposes, by turning off the current at the switch y. When the machine stops automatically, it is also preferable to turn off the current to guard against an accidental contact at G starting the machine before the operator has prepared it for operation.

While we have specified certain preferable arrangements of structure and operation, it will be obvious that the device herein described might be modified considerably and still come within the scope of this invention. Therefore, we do not limit ourselves to the precise arrangement shown, but

What we claim is:

1. The combination in a press adapted to act on a fed material, and with means to feed the material, of driving means to operate the press, devices to couple and uncouple the driving means and the press, a member continuously moved with the driving means, means to connect the moving member with the coupling devices to couple and actuate the press, and a detector device to cause action of the coupling device when the fed material is in position to be acted upon and cause non-action of said coupling device when the fed material is not in position to be acted upon.

2. The combination with a machine having a fed material and means for acting thereon, and including driving means therefor and devices for controlling the action of said driving means, of a continuously driven member operated by the driving devices and a normally still member adapted to be connected together, and means for engaging the two members constructed to be operated by contact with the fed material.

3. The combination with a press, a continuously rotating wheel, a clutch, a feed device and a material continuously fed thereby to the press, of a normally moving member driven from the wheel, a normally still member connected with the clutch, engaging means whereby the normally still member is engaged with the normally moving member to be shifted thereby to operate the clutch, and contact means through which said engagement is effected by contact of the continuously fed material.

4. The combination with a press, its continuously rotating wheel, its clutch, its feed devices and a material continuously fed thereby to the press, of a normally moving member driven from the wheel, a normally still member connected with the clutch, engaging means whereby the normally still member is engaged with the normally moving member, electro-magnetic devices for effecting such engagement, and contact means operated by the material to effect the action of the electro-magnetic devices and control the action of the press.

5. The combination in a press with the material to be operated upon, of the shaft, the continuously rotated balance-wheel on the shaft, a clutch device to engage the wheel with the shaft, a lever to operate said clutch device, a member driven by the balance-wheel, a second member connected to operate the lever and adapted to be engaged with the first member, and means controlled by proper positioning of the stock to regulate the engagement of the two members.

6. The combination in a press with the stock s shaft C, continuously rotated balance-wheel D and clutch E for connecting the shaft with the balance-wheel, of a feeding mechanism H connected with the shaft C to intermittently feed the stock s, a controlling means F for operating the clutch device and a contact device having terminals adapted to be operated by the interposition of the stock between the terminals to actuate the clutch controlling means.

7. The combination in a press with a driving shaft C, a punch b reciprocated from the shaft, means to rotate the shaft and a clutch device for controlling said rotation, of a feeding mechanism H operated from the shaft to feed the stock after each downward stroke of the punch, a controlling means F for the clutch device, and a contact device G for operating the clutch controlling means, upon the proper feeding of the stock, having two contact members g and j, between which the stock is fed and dependent for its operation upon the contact of said stock with both the two contact members.

8. The combination in a power-press with the material operated upon, of a punch to sever portions of the material, means actuated by the material to control the punch and means spring operated and controlled from the movement of the punch to eject the severed portion after each action of the punch.

9. An ejector device for presses, comprising a plunger, a spring to operate the plunger, means to return and retain the plunger against the action of the spring, and means to release said plunger.

10. The combination with a press and the finished pieces formed by the press, of an ejector device for said pieces, comprising a plunger, a spring to press the plunger, a second lighter spring compressed by the action of the first spring and serving to partly return the plunger, and means to wholly return the plunger and retain it against the action of the first spring.

11. The combination with a movable member B, of a press, of an ejector device having a plunger 77, a spring 80 to press the plunger, a lever 81 engaging the plunger 77, a lever 83 engaging the lever 81 to retain the plunger, a pin 89 connected with the moving member B and adapted to engage the lever 83 to release the lever 81, and a stud 103 also connected with the member B and adapted to engage the lever 81 to return the latter to be engaged by the lever 83.

12. The combination in a press with the material operated upon, of the shaft C, balance-wheel D rotated on said shaft, and a going member 56 operated from the wheel D, of a key 47 slidable on the shaft, means to press the key into engagement with the wheel D, a lever 51 normally held in position to engage the key to withdraw it from the wheel and means operated by the material to engage the lever 51 with the going member 56.

13. The combination in a press with the material to be operated upon, driving means and devices for controlling the action of said driving means, of a plunger reciprocated by the driving means, a second plunger connected with the controlling devices, a pawl on one plunger, movable to engage the other plunger, a lever adapted to engage the pawl and bearing an armature, magnet coils adjacent the armature, a normally open electric circuit including the magnet coils, and a contact device adapted to receive the material when properly fed, to close the circuit.

In testimony whereof we have signed our names to this specification in the presence of two subscribing witnesses.

NILS C. WALLENTHIN.
EDWIN C. SMITH.

Witnesses:
CARL V. J. CHRISTENSEN,
WILBER T. REYNOLDS.